UNITED STATES PATENT OFFICE.

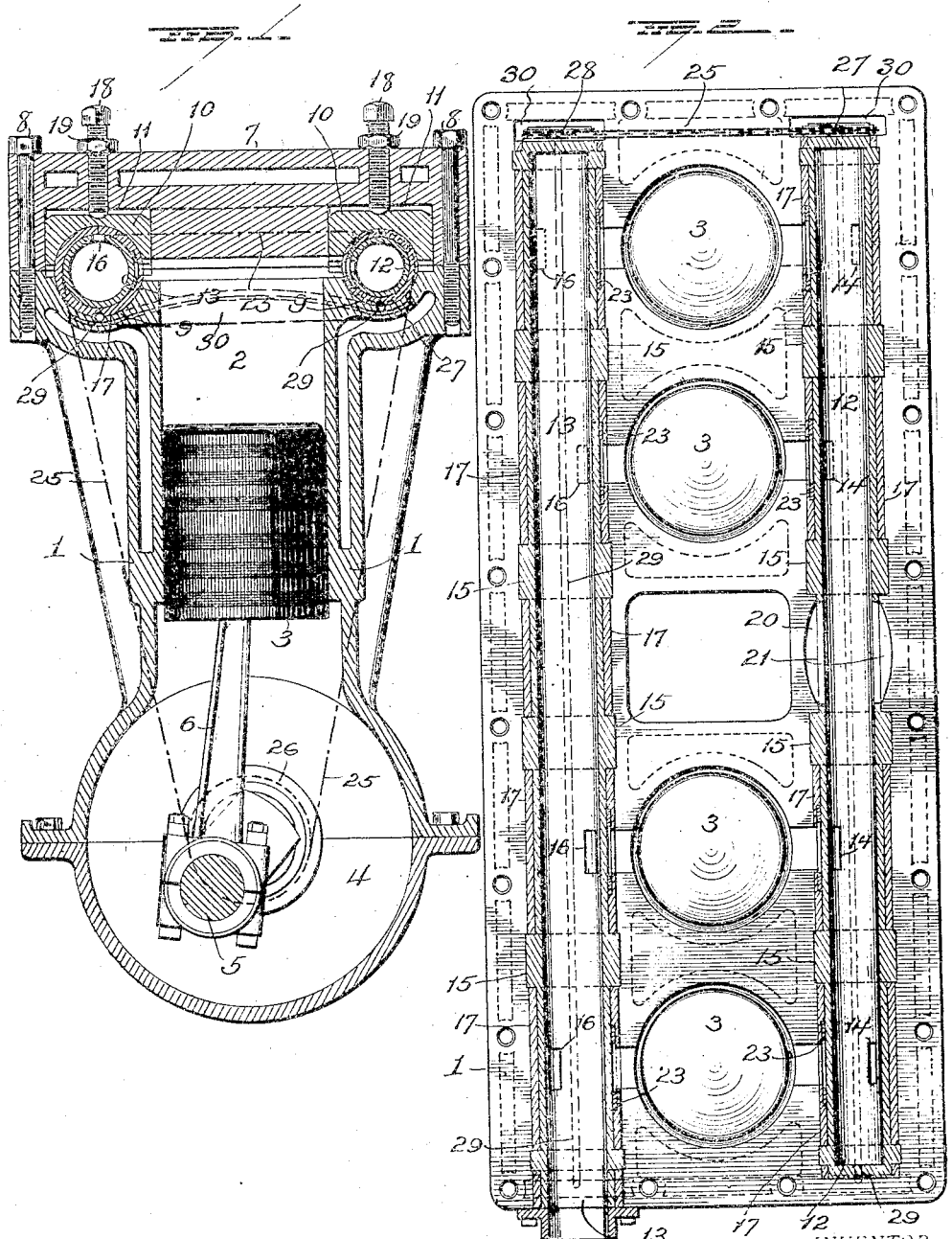

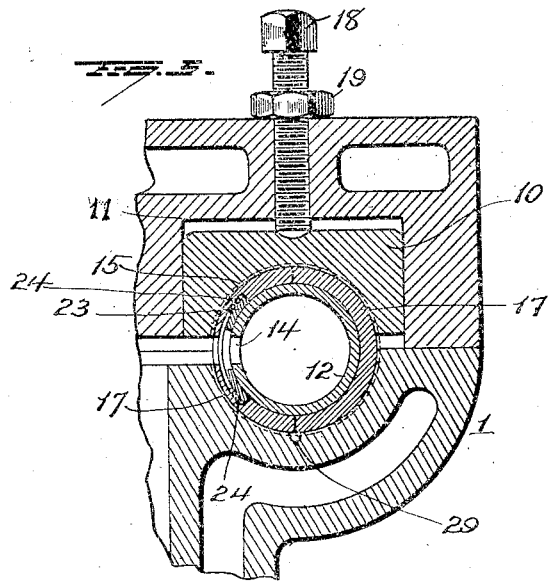
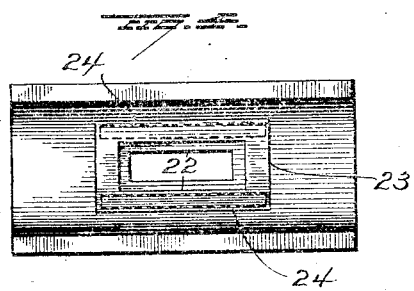
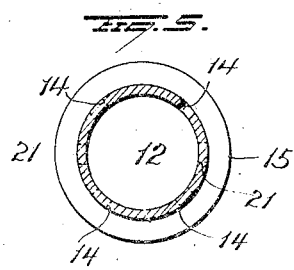

WILLIAM BURNS McNAIR, OF HARRISBURG, PENNSYLVANIA.

VALVE MECHANISM FOR ENGINES.

1,326,521.  Specification of Letters Patent.  Patented Dec. 30, 1919.

Application filed February 27, 1918. Serial No. 219,488.

*To all whom it may concern:*

Be it known that I, WILLIAM B. MCNAIR, a citizen of the United States, and a resident of Harrisburg, in the county of Dauphin and State of Pennsylvania, have invented certain new and useful Improvements in Valve Mechanism for Engines, and do hereby declare the following to be a full, clear, and exact description of the invention, such as will enable others skilled in the art to which it appertains to make and use the same.

This invention relates to improvements in valve mechanism and more particularly to such as are adaptable for use with internal combustion engines,—one object of the invention being to provide a simple valve structure of the rotary valve type, in which longitudinal displacement of the valve shall be prevented; to guard against leakage at the ports, and to insure the smooth and effective operation of said valve.

With this and other objects in view, the invention consists in certain novel features of construction and combinations of parts as hereinafter set forth and pointed out in the claims.

In the accompanying drawings: Figure 1 is a transverse vertical sectional view of an engine showing an embodiment of my invention; Fig. 2 is a horizontal sectional view; Fig. 3 is an enlarged sectional view showing the inlet valve and its mountings; Fig. 4 is an enlarged detail view of a portion of the bushing and showing packing means for the ports and Fig. 5 is an enlarged sectional view of the inlet valve tube.

1 represents an engine casing comprising a cylinder 2 having a piston 3 therein, and a crank pit 4, in which latter the crank shaft 5 is mounted and connected with the piston by means of a pitman 6, as is well understood.

A head 7 is secured to one end of the engine casing by means of bolts 8. The end of the engine casing is made with seats 9 which form half-bearings for the rotary valve mechanisms hereinafter described,—the other half-portions of said bearings being formed by concave bars 10 mounted in recesses 11 in the head 7. In Figs. 1 and 2, the inlet valve is represented at 12 and the exhaust valve at 13,—the latter being preferably somewhat greater in diameter than the valve 12.

The inlet valve 12 is made in the form of a single tube closed at both ends and provided with a plurality of ports 14 to communicate in proper succession with the several cylinders 2 shown in Fig. 1,—and the valve tube is provided at intervals with annular flanges 15 (said flanges preferably alternating with the ports 14) which rotate in suitable grooves or recesses formed in the seat 9 and bearing bar 10 to prevent longitudinal displacement of the valve tube. The exhaust valve tube 13 is similarly provided with annular flanges 15 to rotate in grooves or recesses for the same purpose. The exhaust valve tube is closed at one end and open at the other end and it is provided with suitable ports, such as shown at 16 to permit the escape of exhaust products of combustion from the cylinders. The valves 12 and 13 are inclosed by bushings 17 disposed between the annular flanges 15 and each of said bushings is made in at least two parts as shown in Fig. 1 and seated in the seats 9 and bearing bars 10. To compensate for wear and to properly hold the bushings in place, set screws 18 are provided,—said set screws passing through the head 7 and engaging the bearing bars, and suitable jam nuts 19 on said screws will serve to retain the latter in the position to which they may be adjusted.

A chamber 20 surrounds the central portion of the inlet valve tube 12 and communicates therewith through ports 21 so that explosive mixture supplied to said chamber from a suitable source, will flow in both directions in said tube and find its way to the cylinders through the ports 14 as the latter are successively opened. The bushings of each of the valve tubes are recessed adjacent to the ports 22 therein for the accommodation of packing frames 23 which surround said ports and these packing frames are pressed against the valve tube by springs 24 located behind the packing frames in the recesses of the bushings.

The two valve tubes are rotated continuously by a noiseless drive chain 25 which receives motion from a sprocket wheel 26 on the crank shaft 5 and passes over sprocket wheels 27, 28, secured to the respective valve tubes. This chain may also be utilized to carry lubricant up from the crank pit and deliver it through the medium of a trough 30 to lubricating ducts 29 disposed under the respective valve bushings for supplying lubricant to the valves.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with an engine having a valve seat in its casing, of a rotary tubular valve having circumferential flanges mounted on said seat, segmental bushings encircling the valve tube between said flanges and also mounted on said seat, a recessed member over said valve and engaging said bushings, said valve having ports to communicate with the cylinders of the engine, and means for rotating said valve.

2. The combination with an engine having a valve seat in its casing, and a recessed head, of a rotary tubular valve having circumferential flanges, mounted on said seat, segmental bushings encircling the valve tube between said flanges and also mounted on said seat, recessed bars in the recessed head of the casing and engaging both segments of said bushings, said valve having ports to communicate with the cylinders of the engine, and means for rotating said valve.

3. In an engine, the combination with the casing and a recessed head secured thereto, said casing having a seat at one end, of a bar movable in said recessed head and having a seat, said seats having transverse grooves, of a rotary valve disposed between said seats and having circumferential flanges to enter the transverse grooves in said seats, segmental bushings surrounding said rotary valve between the circumferential flanges, the bar in the recessed head engaging both segments of each bushing, and an adjusting screw passing through the engine head and engaging said bar.

4. The combination with an engine comprising a casing, a cylinder, a piston, a crank shaft connected with the piston, and a crank pit, of rotary inlet and exhaust valves mounted in the casing, said casing having lubricant ducts under said valves, sprocket wheels on the valves, a sprocket wheel on the crank shaft in the crank pit, and a drive chain passing over said sprocket wheels to drive the valves and convey lubricant from the crank pit and deliver it to said lubricant ducts.

In testimony whereof I have signed this specification in the presence of two subscribing witnesses.

WILLIAM BURNS McNAIR.

Witnesses:
 LEO GEORGE MARTIN,
 EMANUEL L. HAINES.